Feb. 26, 1957  J. J. VANDERHOOFT  2,782,699
SCANNING CAMERA
Filed Aug. 10, 1953
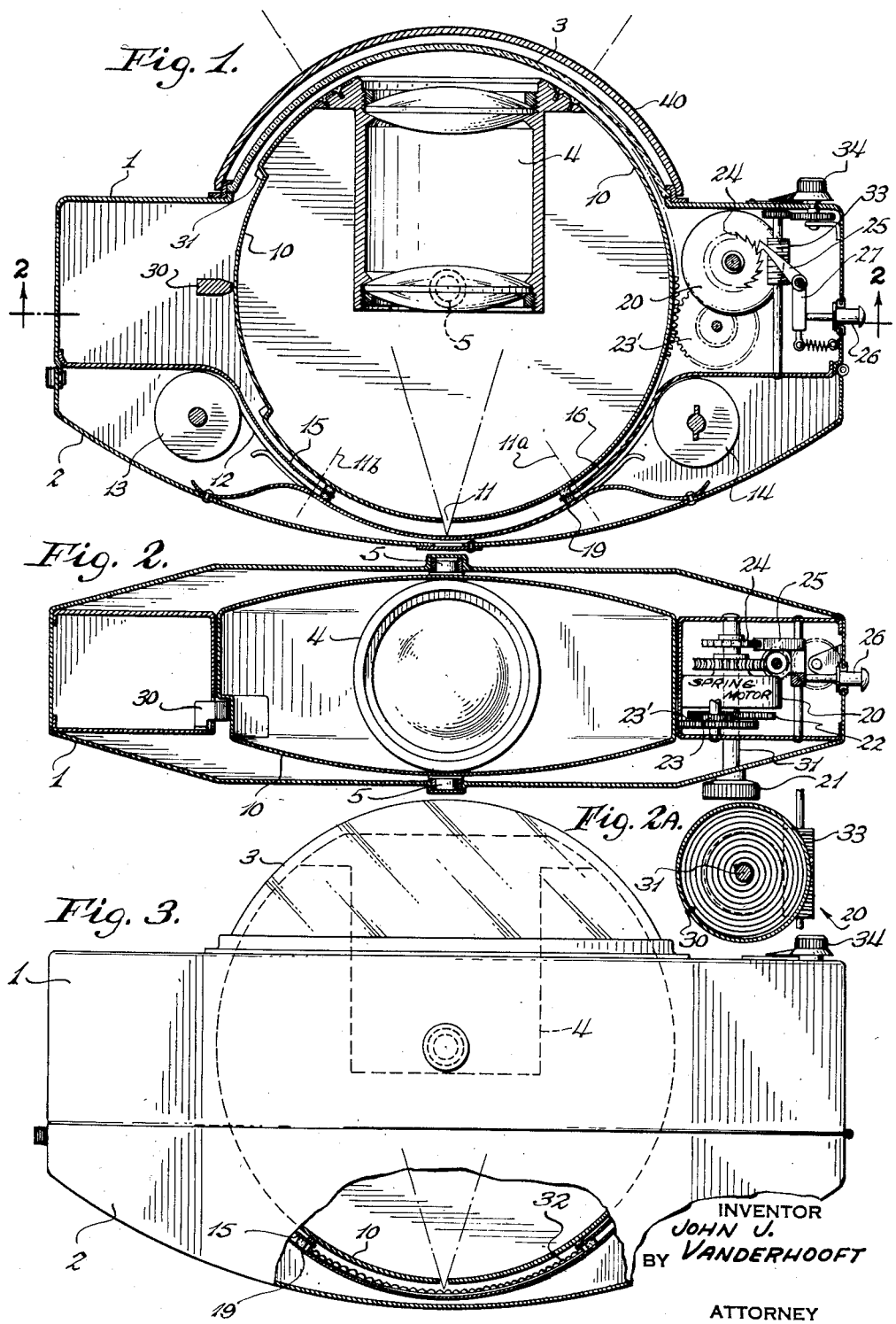
INVENTOR
JOHN J.
BY VANDERHOOFT
ATTORNEY

United States Patent Office 2,782,699
Patented Feb. 26, 1957

2,782,699

SCANNING CAMERA

John J. Vanderhooft, Jamaica, N. Y.

Application August 10, 1953, Serial No. 373,246

3 Claims. (Cl. 95—16)

This invention relates to panoramic or scanning cameras for taking wide angle pictures. The invention also relates to means for adapting said cameras for taking stereoscopic pictures with a scanning lens and a lenticulated lens screen.

This application is a continuation in part of my prior application S. N. 241,737, filed August 14, 1951, now abandoned, for Multiplex Photographic Apparatus.

It is old to take stereo pictures through lenticulated screens by moving a conventional camera relative to the subject (see Popular Mechanics, October 1947, page 135). In the present invention, the camera does not move, but only the lens which is rotatably mounted. The light passes through the lens and through a light proof enclosure connected to the lens and through a slit in the rear of said enclosure. The enclosure and lens scan together so that the slit passes the film as the lens scans.

The camera may be used without the lenticulated screen to take panoramic or wide angle pictures having an angle of as much as 140° or more.

Accordingly, a principal object of the invention is to provide new and improved wide angle camera means.

Another object of the present invention is to provide new and improved panoramic camera means.

Another object of the present invention is to provide a camera with a scanning lens system.

Another object of the present invention is to provide a stereoscopic camera.

Another object of the present invention is to provide a stereoscopic camera with a scanning lens system.

Another object of the present invention is to provide a multiplex panoramic and stereo camera.

Another object of the present invention is to provide a combined panoramic and stereo camera wherein the lens is rotatably mounted and motor driven to scan a field of view.

These and other objects of the invention will be apparent from the following specification and drawings of which:

Figure 1 shows a top view of an embodiment of the invention.

Figure 2 shows a sectional side view of the embodiment of Figure 1, along the line 2—2.

Figure 2a is a detail view of the spring motor.

Figure 3 shows a view illustrative of the use of the invention with a ribbed or lenticulated screen.

Referring to Figure 1, there is shown a camera casing 1 having a curved rear surface 2 and a protruding circular portion 3 at the front. The lens system 4 is rotatably mounted on the case by means of the pin 5 and the lens is adapted to rotate from one side to the other, as illustrated by the dotted lines, so that by scanning the lens, it is possible to take a very wide angle picture for instance, of 140°. Of course, the front portion 3 of the case must be of glass or plastic to permit the light to enter from all angles.

Attached to the lens system 4 is a circular enclosure 10 which is fixedly connected to the lens system 4 and adapted to rotate together with the lens. The enclosure 10 has a slit 11 in the rear.

The film 12 is mounted on conventional rollers 13 and 14 which are adapted to be advanced in conventional manner. Between the rotatable enclosure 10 and the film 12, there are interposed two light proof screens 15 and 16 which cooperate with the slit 11 to form a shutter. Therefore, when the lens and enclosure are rotated completely to one side, the slit 11 will be at one of the dotted positions 11a or 11b, so that light cannot pass through to the film 12. Suitable guide means 19 are provided to guide the film. As the lens is scanned from left to right, the slit 11 will scan the film 12 thereby imparting to the film a wide angle picture. In order that the scanning of the lens be smooth and uniform, it is desirable that the scanning be done by a motor.

Referring to Figures 1 and 2, the scanning motor may be a spring wound motor 20 which is adapted to be wound by the knob 21. The spring motor 20 is geared to the lens enclosure 10 by means of the gears 22, 23 and 23'. In addition to the gears, the motor shaft has a ratchet wheel 24 which cooperates with a pawl 25 for winding up the motor. Note that the motor is directly geared to the lens enclosure 10 so that when the motor is wound, the lens enclosure will be moved to the extreme left.

The motor is released by tripping the pawl 25 by means of the push button 26 which is connected to one end of the lever 27. The other end of the lever 27 is fixedly connected to pawl 25. Therefore, when the button 26 is pushed in, the member 27 will be pivoted clockwise, releasing the pawl 25 from the ratchet wheel 24. Thereupon the spring motor will drive the lens system through the gear train 22, 23, 23' through a complete scanning operation. A pair of stops 30 and 31 may be attached respectively to the camera case 1 and the lens enclosure 10 in order to provide proper registration of the lens system. Alternatively, a stop could be provided in the motor drive system.

Referring to Figures 2 and 2A, the spring motor 20 may comprise an outer casing 30 and a center shaft 31 which are connected by the spiral spring 32. The motor is wound by turning the shaft 31 by means of the knob 21. The amount of tension produced in the spring may be adjusted by rotating the case 30 by means of the worm gear 33, the knob 34. Therefore, the knob 34 will adjust the time of scanning which is the exposure time. It does this since it controls the speed of the spring wound motor. Alternatively, equivalent variable speed drives may be used.

When the lens system 4 is taking a picture it scans in one direction, for instance, from left to right and the slit 11 traverses the film 12 thereby exposing the films. When the motor is wound, due to the direct gearing, the lens system is returned from right to left from its initial position. In order to avoid exposing the film, during this return, a removable light proof mask 40 is placed over the front of the camera. Alternatively, means could be incorporated for declutching the motor from the lens enclosure 10 while the motor is being wound and for reversing the drive so that the picture could be taken from left to right and the next picture from right to left. Other reversible drives could be used. However, these mechanical details are beyond the scope of the present invention.

Referring to Figure 3, there is shown a view illustrative of the use of the invention for taking stereoscopic pictures. For this application, a lenticulated screen 32 is inserted in front of the film. Therefore, as the lens system is scanned as explained in connection with Figure 1, a stereoscopic photographic reproduction will be produced on the film in the same manner as if the entire camera was scanned in conventional manner, as is well known in the prior stereo art. The picture thus put on the film comprises a series of lines and the picture must be viewed through a lenticulated screen in order to recover and view the original image. When the picture is so viewed through a ribbed screen, due to the distance between the eyes of the observer the viewer sees two different images, thereby giving him a stereo effect. This general field is well known.

The present invention resides in incorporating the scanning inside the camera rather than mounting the camera on a track as previously done. With the present invention, this type picture may be taken with a small pocket size camera which may be used outside or any other conditions. Formerly, these pictures could only be taken in a studio which was suitably provided with a curved track for moving the camera.

The present invention illustrates the film in a curved position which is preferable. However, the invention may be used with the film perfectly flat and the lenticulated screen as well, but this is not as preferable as the curved arrangement of the present invention.

I claim:

1. A stereoscopic camera comprising an optical system embodying the two stereoscopic points of view including a rotatable single lens having a width substantially as great as the interocular spacing, an enclosure connected to said optical system, said enclosure having a curved rear wall with a slit in it, means to converge said two points of view, means to rotatably mount said optical system and enclosure, a lenticular screen or grid mounted behind said enclosure, means to mount a film behind screen or grid, whereby said optical system scans said screen or grid and film as it rotates.

2. A stereoscopic camera comprising an optical system embodying the two stereoscopic points of view including a rotatable single lens having a width substantially as great as the interocular spacing, an enclosure connected to said optical system, said enclosure having a curved rear wall with a slit in it, means to converge said two points of view, means to rotatably mount said optical system and enclosure, ribbed separating means behind said enclosure, means to mount a film behind screen or grid, whereby said optical system scans said screen or grid and film as it rotates, and a motor connected to said scanning lens system.

3. A stereoscopic camera comprising a rotatably mounted optical system including a rotatable single lens having a width substantially as great as the interocular spacing, a motor adapted to drive said optical system, a light proof screen having a slit therein said screen being connected to said optical system, means to mount a lenticular ribbed screen or grid behind said light proof screen and means to scan said ribbed screen or grating and film as said optical system rotates.

References Cited in the file of this patent

UNITED STATES PATENTS

| 492,703 | Zenk | Feb. 28, 1893 |
| 1,257,656 | Warman | Feb. 26, 1918 |
| 2,148,011 | Burke | Feb. 21, 1939 |
| 2,599,454 | Hudeley | June 3, 1952 |